US009954742B2

(12) United States Patent
Rustagi et al.

(10) Patent No.: US 9,954,742 B2
(45) Date of Patent: Apr. 24, 2018

(54) METHODS, NETWORK NODES, AND COMPUTER PROGRAM PRODUCTS FOR PROVIDING COST-INFORMATION FROM MULTIPLE BALANCES

(71) Applicant: Telefonaktiebolaget L M Ericsson (publ), Stockholm (SE)

(72) Inventors: Saket Rustagi, Delhi (IN); Saurabh Gupta, Etawah (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 311 days.

(21) Appl. No.: 14/495,188

(22) Filed: Sep. 24, 2014

(65) Prior Publication Data
US 2016/0087857 A1    Mar. 24, 2016

(51) Int. Cl.
*H04L 12/24*        (2006.01)
*G06Q 20/12*        (2012.01)
(Continued)

(52) U.S. Cl.
CPC ....... *H04L 41/5029* (2013.01); *G06Q 20/123* (2013.01); *G06Q 20/227* (2013.01); *H04L 65/4084* (2013.01); *H04L 65/80* (2013.01)

(58) Field of Classification Search
CPC . H04L 41/5029; H04L 65/80; H04L 65/4084; G06Q 20/227; G06Q 20/123
See application file for complete search history.

(56) References Cited

U.S. PATENT DOCUMENTS

2006/0248007 A1* 11/2006 Hofer .................. G06Q 20/102
                                                                705/40
2008/0027839 A1*  1/2008 O'Regan .......... H04M 15/7655
                                                                705/34
(Continued)

FOREIGN PATENT DOCUMENTS

WO    WO 2012/150885 A1 *   8/2012    ............. G06Q 30/04

OTHER PUBLICATIONS

Wikipedia, "Diameter Credit-Control Application", Jun. 2, 2013, 4 pages.*

(Continued)

*Primary Examiner* — Brian J Gillis
*Assistant Examiner* — Amy Ling
(74) *Attorney, Agent, or Firm* — Patent Portfolio Builders, PLLC

(57) ABSTRACT

A method performed in a first network node, includes the first network node receiving, from a second network node, a request specifying a user account and a media content. The method further includes the first network node retrieving, from a database, a database object associated with the user account, the database object including a first parameter associated with a non-monetary balance. The method further includes the first network node retrieving, from the database, at least one predefined rule associated with the media content. The method further includes the first network node determining an advice of charge using the database object and the at least one predefined rule, the advice of charge specifying a deduction from the non-monetary balance for downloading the media content. The method also includes the first network node transmitting the advice of charge to the second network node.

19 Claims, 13 Drawing Sheets

(51) Int. Cl.
G06Q 20/22 (2012.01)
H04L 29/06 (2006.01)

(56) References Cited

U.S. PATENT DOCUMENTS

| | | | | |
|---|---|---|---|---|
| 2009/0076984 | A1* | 3/2009 | Guionnet | G06Q 30/0283 |
| | | | | 705/400 |
| 2010/0179869 | A1* | 7/2010 | Hofer | G06Q 20/102 |
| | | | | 705/14.23 |
| 2010/0211469 | A1* | 8/2010 | Salmon | G06Q 20/06 |
| | | | | 705/16 |
| 2011/0314036 | A1* | 12/2011 | Cunningham | G06Q 30/02 |
| | | | | 707/756 |
| 2012/0123919 | A1* | 5/2012 | Li | G06Q 30/04 |
| | | | | 705/34 |
| 2013/0130642 | A1* | 5/2013 | Joul | H04L 41/5029 |
| | | | | 455/406 |
| 2014/0036785 | A1* | 2/2014 | Li | H04L 12/1407 |
| | | | | 370/328 |

OTHER PUBLICATIONS

RFC4006, "Diameter Credit-Control Application", Network Working Group, Aug. 2005, 114 page.*
3GPP TR 32.825, V10.0.0, (Mar. 2010), "Charging Management, Release 10", 22 pages.*

* cited by examiner

Unit-Cost-Information
    Balance-Info
        Balance-Name(B1)
        Balance-Type(kilobyte)
        Unit-Value
        Cost-Unit
    Balance-Info
        Balance-Name(B2)
        Balance-Type(kilobyte)
        Unit-Value
        Cost-Unit
    ...

FIG. 7

Cost-Information
        Unit-Value
        Currency-Code ($)
        Cost-Unit
        Balance-Info
            Balance-Name(B3)
            Balance-Type(Monetary)
            Unit-Value
            Cost-Unit
        Balance-Info
            Balance-Name(MB)
            Balance-Type(Monetary)
            Unit-Value
            Cost-Unit
        ...

FIG. 8

METHODS, NETWORK NODES, AND COMPUTER PROGRAM PRODUCTS FOR PROVIDING COST-INFORMATION FROM MULTIPLE BALANCES

TECHNICAL FIELD

This disclosure relates to methods, network nodes, and computer program products for providing cost-information from multiple balances

BACKGROUND

Currently, there a lot of content providers (CP) who have a lot of content such as online movies, television series, and popular English novels. The CP can contract with a telecom service provider (SP) to charge its subscribers for accessing their content. When downloading content, the RFC 4006 (Diameter Credit Control Application) and 3GPP 32.299 provides a mechanism to return the cost information to the subscriber for a service using a Cost-Information AVP (AVP Code 423). The Cost-Information AVP is used to return the cost information, which the credit-control client can transfer transparently to the end user. This AVP provides the cost estimate of the service in terms of a monetary unit. However, the RFC 4006 (Diameter Credit Control Application) and 3GPP 32.299 do not provide a mechanism for a subscriber to enquire the cost information of a service if cost is taken from a non-monetary balance, or if the cost is taken from multiple balances.

SUMMARY

According to some embodiments, a method performed in a first network node, includes the first network node receiving, from a second network node, a request specifying a user account and a media content. The method further includes the first network node retrieving, from a database, a database object associated with the user account, the database object including a first parameter associated with a non-monetary balance. The method further includes the first network node retrieving, from the database, at least one predefined rule associated with the media content. The method further includes the first network node determining an advice of charge using the database object and the at least one predefined rule, the advice of charge specifying a deduction from the non-monetary balance for downloading the media content. The method also includes the first network node transmitting the advice of charge to the second network node.

In some embodiments a method performed in a first network node includes the first network node receiving, from a second network node, a request specifying a user account and a media content. The method further includes the first network node retrieving, from a database, a database object associated with the user account, the database object including a first parameter associated with a first monetary balance and a second parameter associated with a second monetary balance. The method further includes the first network node retrieving, from the database, at least one predefined rule associated with the media content. The method further includes the first network node determining an advice of charge using the database object and the at least one predefined rule, the advice of charge specifying a deduction from the first monetary balance and/or second monetary balance for downloading the media content. The method also includes the first network node transmitting the advice of charge to the second network node.

According to some embodiments, a first network node comprises a processor and a computer readable medium coupled to the processor, said computer readable medium containing instructions executable by the processor. The first network node is operative to receive, from a second network node, a request specifying a user account and a media content. The first network nodes is operative to retrieve, from a database, a database object associated with the user account, the database object including a first parameter associated with a non-monetary balance. The first network node is operative to retrieve, from the database, at least one predefined rule associated with the media content. The first network node is operative to determine an advice of charge using the database object and the at least one predefined rule, the advice of charge specifying a deduction from the non-monetary balance for downloading the media content. The first network node is also operative to transmit the advice of charge to the second network node.

In some embodiments, a first network node comprises a processor and a computer readable medium coupled to the processor, said computer readable medium containing instructions executable by the processor. The first network node is operative to receive, from a second network node, a request specifying a user account and a media content. The first network node is further operative to retrieve, from a database, a database object associated with the user account, the database object including a first parameter associated with a first monetary balance and a second parameter associated with a second monetary balance. The first network node is further operative to retrieve, from the database, at least one predefined rule associated with the media content. The first network node is further operative to determine an advice of charge using the database object and the at least one predefined rule, the advice of charge specifying a deduction from the first monetary balance and/or second monetary balance for downloading the media content. The first network node is also operative to transmit the advice of charge to the second network node.

According to some embodiments, a computer product comprising a non-transitory computer readable medium for storing computer instructions, which when executed by a first network node causes the first network node to perform a method comprising receiving, from a second network node, a request specifying a user account and a media content. The method further includes retrieving, from a database, a database object associated with the user account, the database object including a first parameter associated with a non-monetary balance. The method further includes retrieving, from the database, at least one predefined rule associated with the media content. The method further includes determining an advice of charge using the database object and the at least one predefined rule, the advice of charge specifying a deduction from the non-monetary balance for downloading the media content. The method also includes transmitting the advice of charge to the second network node.

In some embodiments, a computer product comprising a non-transitory computer readable medium for storing computer instructions, which when executed by a first network node causes the first network node to perform a method comprising receiving, from a second network node, a request specifying a user account and a media content. The method further includes retrieving, from a database, a database object associated with the user account, the database object including a first parameter associated with a first monetary balance and a second parameter associated with a second monetary balance. The method further includes retrieving, from the database, at least one predefined rule associated with the media content. The method further includes determining an advice of charge using the database object and the at least one predefined rule, the advice of charge specifying a deduction from the first monetary balance and/or second monetary balance for downloading the media content. The method also includes transmitting the advice of charge to the second network node.

BRIEF DESCRIPTION OF THE DRAWINGS

The accompanying drawings, which are incorporated herein and form part of the specification, illustrate various embodiments.

FIG. 7 illustrates an exemplary data structure according to some embodiments.

FIG. 8 illustrates an exemplary data structure according to some embodiments.

DETAILED DESCRIPTION

According to some embodiments, for a Diameter Credit Control Request, total units requested for a given service are available where a combination of different balances (which may include non-monetary balances) may be provided. Diameter Credit Control Server, in its response, may also list the Cost/Unit taken from each balance including both monetary and non-monetary balances. Embodiments include a "Unit-Cost-Information" AVP and an evolved "Cost-Information" AVP that includes this information, which can then be provided to the subscriber. The "Unit-Cost-Information" AVP and evolved "Cost-Information" AVP enable a credit-control server can return precise cost information of a service taken from each balance, which the credit-control client can transfer transparently to the end user.

Figure 1:
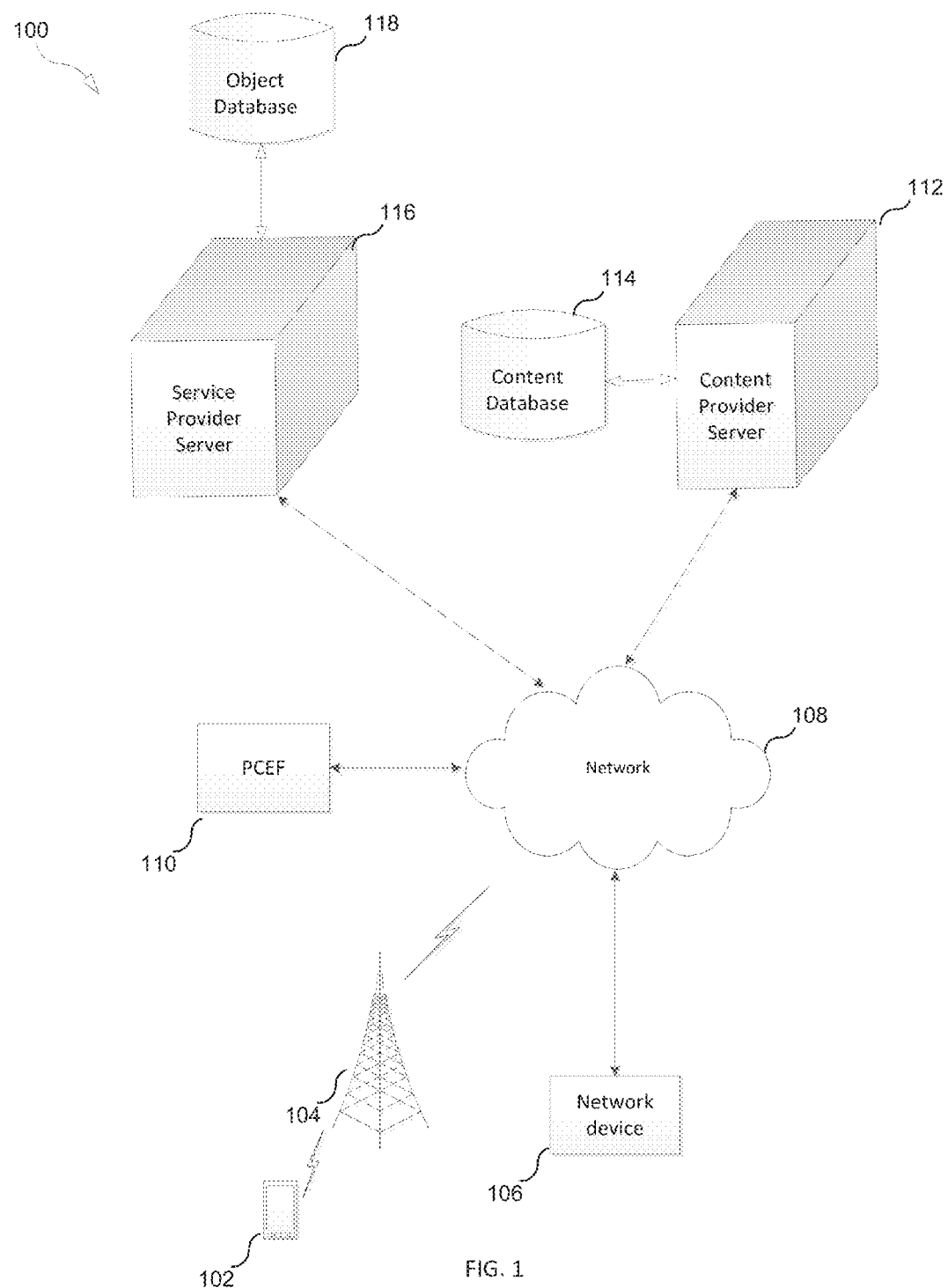
FIG. 1 illustrates an exemplary wireless communication topology.

FIG. 1 illustrates an exemplary embodiment of a wireless communication topology 100. The topology 100 includes a user equipment (UE) 102 in communication with a base station 104 that is in communication with a network 108. The user equipment 102 may be any mobile device known to one of ordinary skill in the art. The topology 100 may include a network device 106 such as a laptop computer in communication with network 108. The topology 100 may further include a Policy Charging Enforcement node 110 in communication network 108. Additionally, the topology 100 may also include content provider server 112 and Service Provider Server 116. Servers 112 and 116 may be connected to a content database 114 and an object database 118, respectively. The content database 114 may store media content such as movies, television shows, music videos etc. The object database 118 may store user subscription information including monetary and non-monetary balances. The object database 118 may also store pre-defined rules that are used to determine tariffs (e.g. deductions) from the monetary and non-monetary balances based on one or more input parameters.

In some embodiments, the non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology such as "radio network node" or simply "network node (NW node)," is used. The network node can be any kind of network node which may comprise of a base station, radio base station, base transceiver station, base station controller, network controller, evolved Node B (eNB), Node B, relay node, access point, radio access point, Remote Radio Unit (RRU) Remote Radio Head (RRH), etc.

The embodiments are described using LTE concepts. However, the embodiments are applicable to any RAT or multi-RAT systems, where the UE regularly assess the serving cell performance by the virtue of the RLM procedure, or equivalent procedures, e.g., LTE FDD/TDD, WCDMA/HSPA, GSM/GERAN, Wi Fi, CDMA2000 etc.

Figure 2:
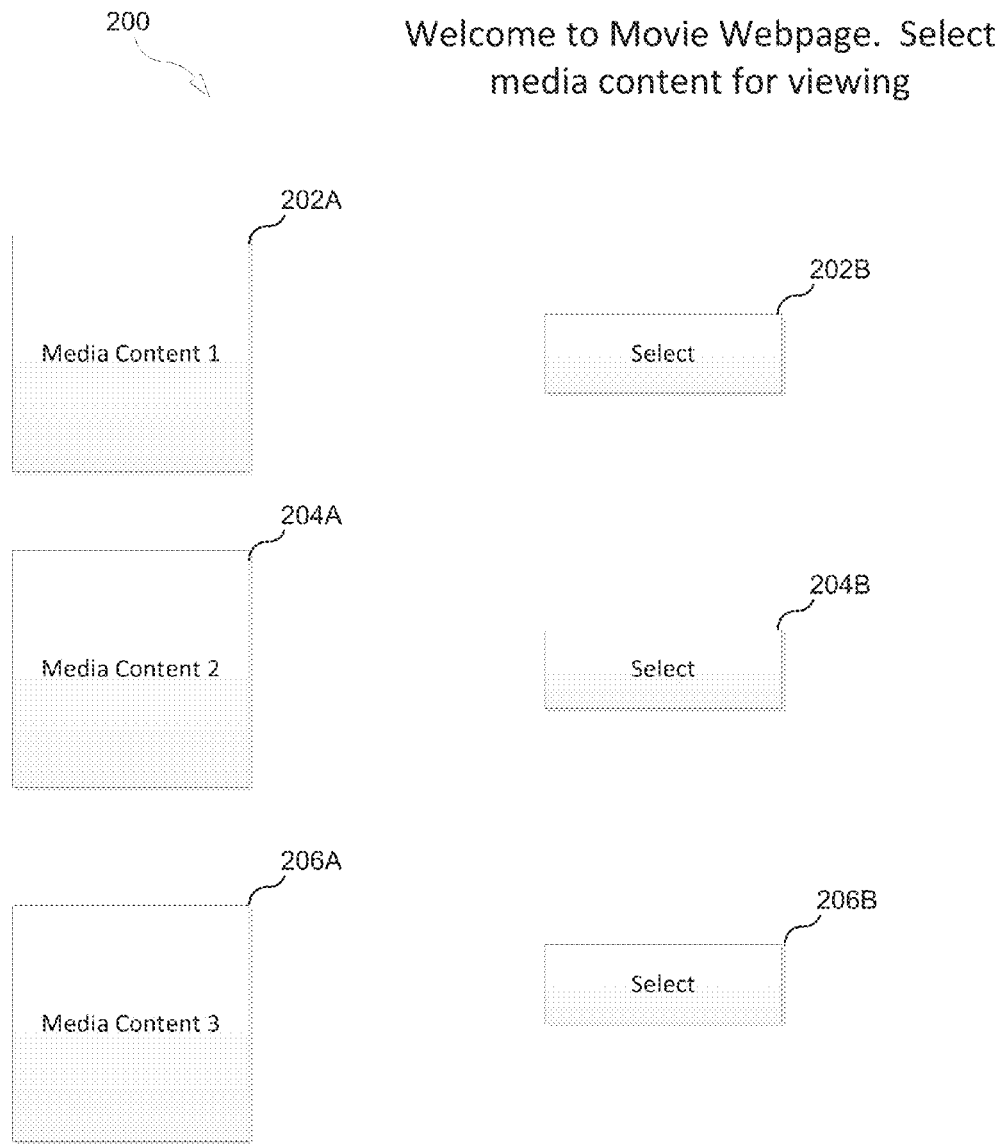
FIG. 2 illustrates an exemplary mobile web page according to some embodiments.

FIG. 2 is embodiment of a mobile web page 200 that is displayed on a UE such as device 102. The web page 200 may be retrieved from the content provider server 110 via network 108 and base station 104. The web page 200 may display one or more icons that represent media content. For example, web page 200 includes icons 202A, 204A, and 206A for Media Content 1-3, respectively. Each icon may be associated with a "select button" (e.g., 202B-206B), where upon selection of this button, a request for the corresponding media content is transmitted to a PCEF node 110.

According to some embodiments, the request includes input parameters used to determine an advice of charge. For example, the request may specify a user account ID, time of request, date of request, user location, etc. The input parameters may be input into one or more pre-determined rules to determine tariff (e.g., deduction) for the non-monetary and/or monetary balances associated with the user account ID.

Figure 3:
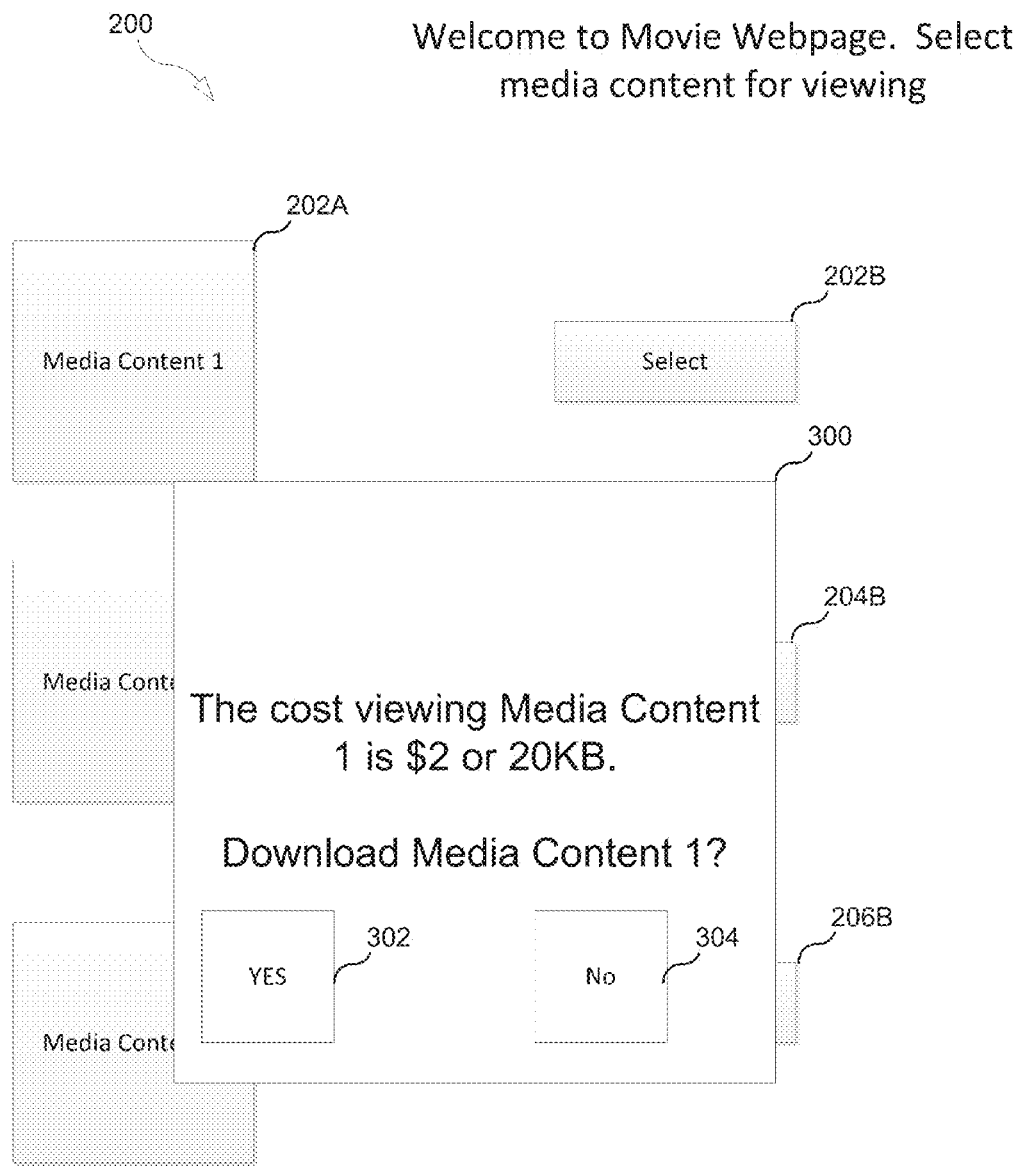
FIG. 3. illustrates an exemplary mobile web page according to some embodiments.

FIG. 3 illustrates an embodiment of example advice of charge 300 displayed on web page 200 upon the user selecting Media Content 1 (202A). For example, the advice of charge 300 indicates that to download Media Content 1, either $2 is deducted from a monetary balance, or 20 KB is deducted from a non-monetary balance. After viewing this advice of charge, if the user decides to download Media Content 1, the user selects the "Yes" button 302, otherwise, the user selects the "No" button 304.

Figure 4:
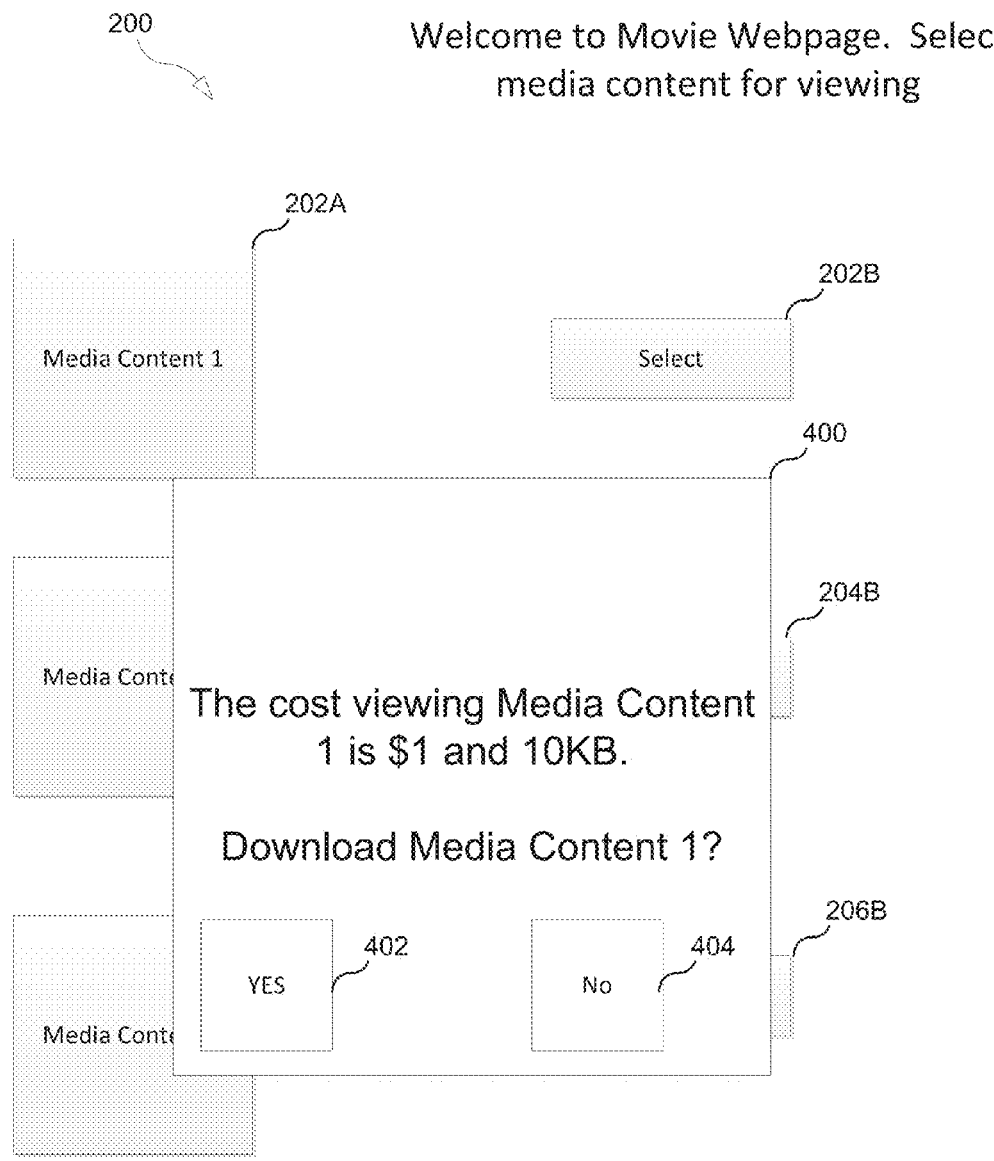
FIG. 4. illustrates an exemplary mobile web page according to some embodiments.

FIG. 4 illustrates and embodiment of an example advice of charge 400 displayed on web page 200 upon the user selecting Media Content 1 (202A). For example, the advice of charge 400 indicates that to download Media Content 1, $1 is deducted from a monetary balance and 10 KB is deducted from a non-monetary balance. After viewing this advice of charge, if the user decides to download Media Content 1, the user selects the "Yes" button 402, otherwise, the user selects the "No" button 404.

Figure 5:
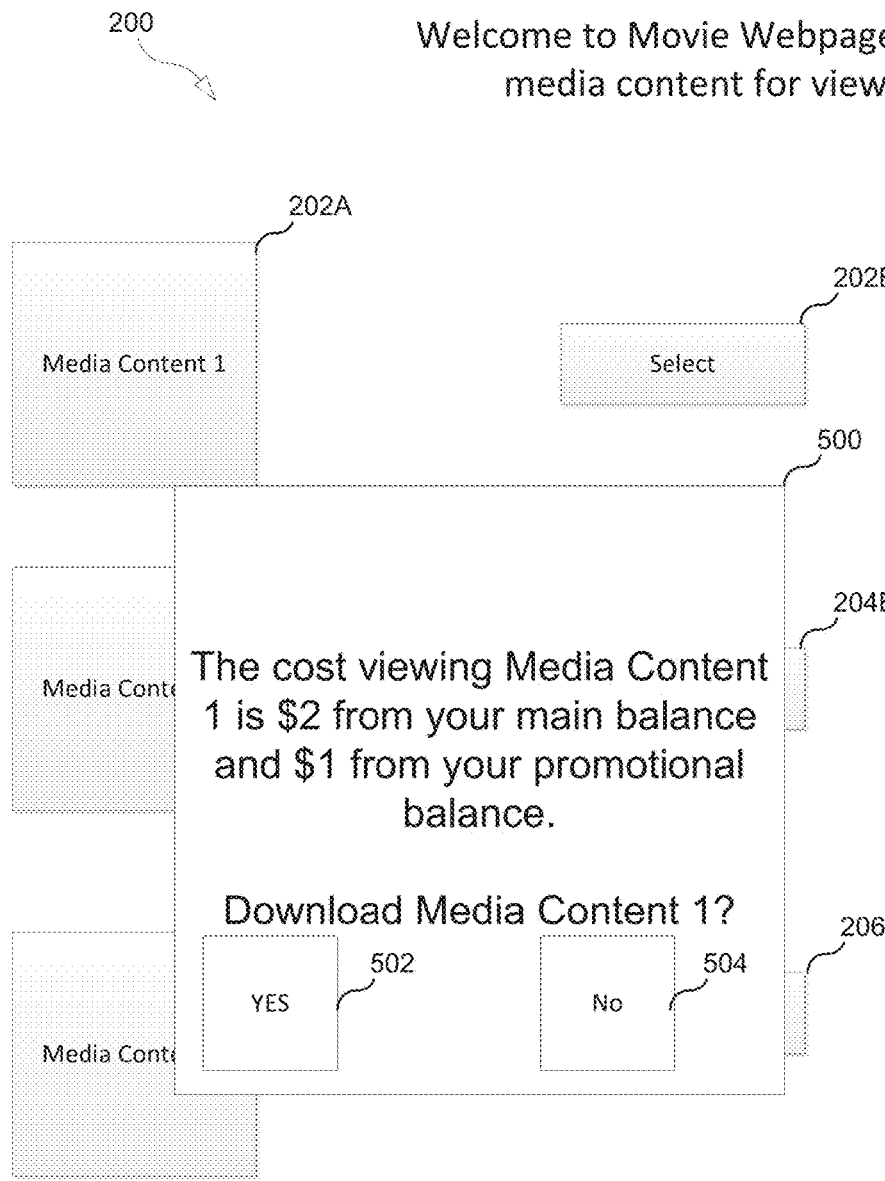
FIG. 5 illustrates an exemplary mobile web page according to some embodiments.

FIG. 5 illustrates and embodiment of an example advice of charge 500 displayed on web page 200 upon the user selecting Media Content 1 (202A). For example, the advice of charge 500 indicates that to download Media Content 1, $2 is deducted from a monetary main balance and $1 is deducted from a monetary promotional balance. The use of the promotional balance in the advice of charge may be based on a time parameter included in the request for Media Content 1. For example, if Media Content 1 is associated with a sale or promotion during the month of December, and the time parameter indicates that the user selects Media Content 1 during the month of December, the user may be provided an advice a charge including the promotional balance. However, if the user selects the Media Content 1 in November instead of December, the user may be provided an advice of charge that specifies that cost of viewing Media Content 1 is $4. Thus, in this scenario, the promotional balance provides a discount to the user based on the time of selection of Media Content 1. After viewing this advice of charge, if the user decides to download Media Content 1, the user selects the "Yes" button 502, otherwise, the user selects the "No" button 504.

Figure 6:
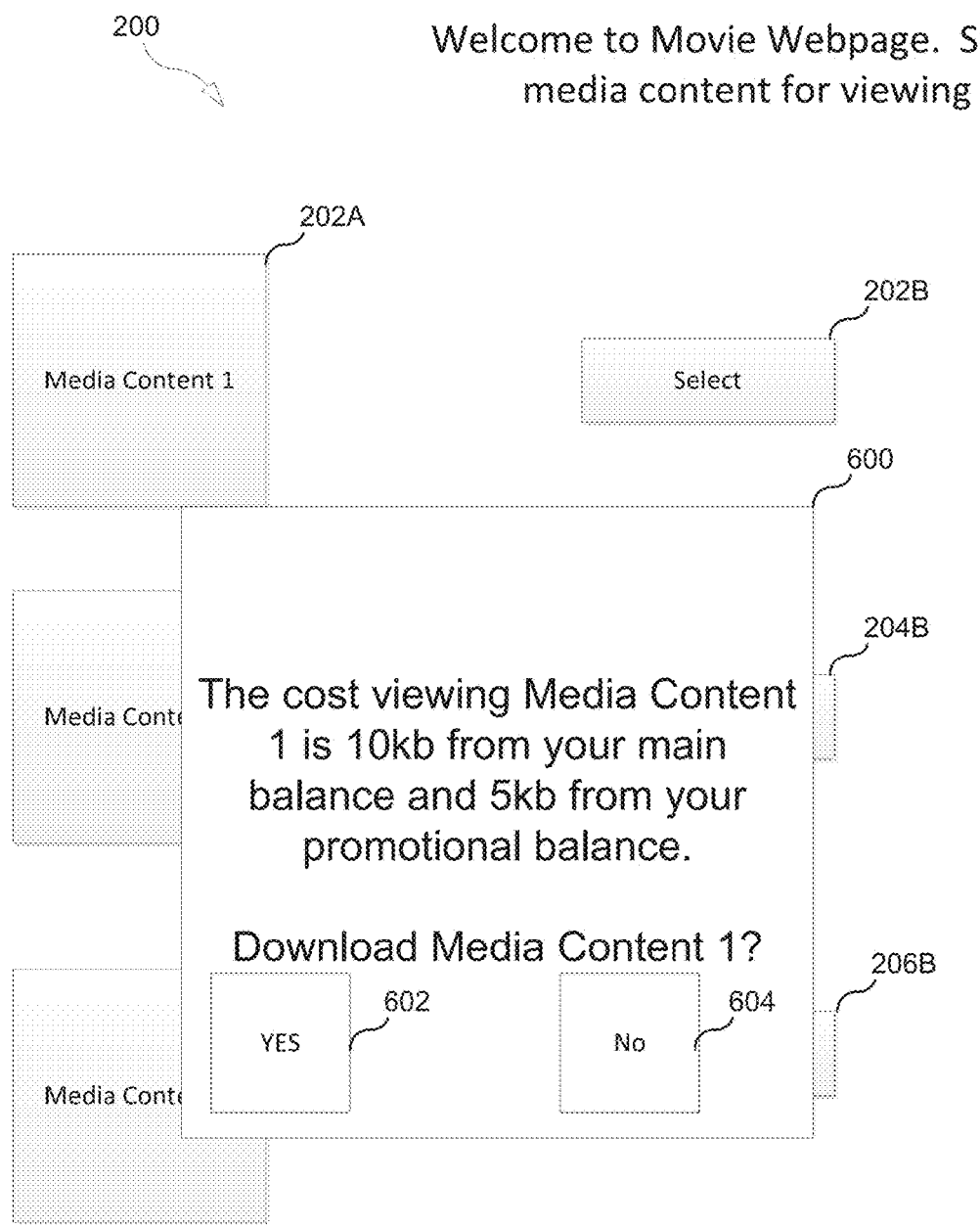
FIG. 6 illustrates an exemplary illustrates an exemplary mobile web page according to some embodiments.

FIG. 6 illustrates and embodiment of an example advice of charge 600 displayed on web page 200 upon the user selecting Media Content 1 (202A). For example, the advice of charge 600 indicates that to download Media Content 1, 10 kb is deducted from a non-monetary main balance and 5 kb is deducted from a non-monetary promotional balance. The use of the promotional balance in this advice of charge may also be based on a time parameter included in the request for Media Content 1. For example, if Media Content 1 is associated with a sale or promotion during the month of December, and the time parameter indicates that the user selects Media Content 1 during the month of December, the user may be provided an advice a charge including the promotional non-monetary balance. However, if the user selects the Media Content 1 in November instead of December, the user may be provided an advice of charge that specifies that cost of viewing Media Content 1 is 20 kb from the non-monetary main balance. Thus, also in this scenario, the promotional balance provides a discount to the user based on the time of selection of Media Content 1. After viewing this advice of charge, if the user decides to download Media Content 1, the user selects the "Yes" button 602, otherwise, the user selects the "No" button 604.

FIG. 7 illustrates an embodiment of a data structure for a "Unit-Cost-Information" AVP that may be used to provide an advice of charge that specifies the cost of viewing media content from one or more non-monetary balances (i.e., Balance B1, Balance B2). Although two non-monetary balances are illustrated in FIG. 7, it is understood by one of ordinary skill in the art that the "Unit-Cost-Information" AVP can include more than two non-monetary balances.

FIG. 8 illustrates an embodiment of a data structure for a "Cost-Information" AVP that may be used to provide an advice of charge that specifies the cost of viewing media content from a plurality of monetary balances (i.e., Balance B3, Main Balance MB). Although two monetary balances are illustrated in FIG. 8, it is understood by one of ordinary skill in the art that the "Cost-Information" AVP can include more than two monetary balances.

Figure 9:
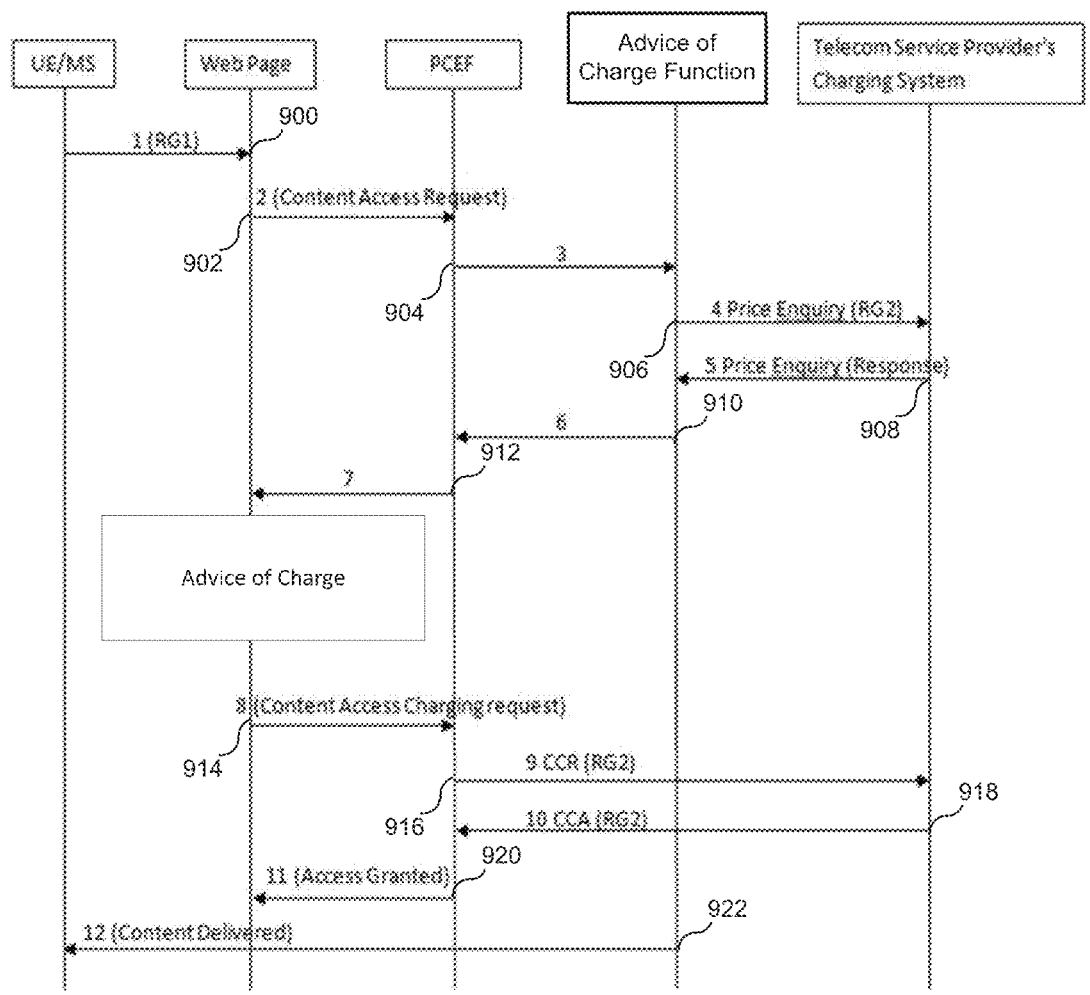
FIG. 9 illustrates an exemplary sequence diagram according to some embodiments.

FIG. 9 illustrates an embodiment of a sequence diagram of a user submitting a request for a media content. Particularly, at step 900, a user may be download a web page associated with a rating/service group (RG) that is not associated with premium content. However, upon accessing a web page that includes premium content such as web page 200, a content access request is sent to the PCEF node 902 upon selection of the premium content. In step 904, the PCEF node determines that the content request is for premium content and forwards the content request to an advice of charge function In step 906, the advice of charge function sends a price enquiry with RG2 to a Telecom Service Provider's Charging System. The RG2 may be used to indicate that the request for content is for premium content. Upon receiving the price enquiry, the charging system may retrieve one or more predefined rules associated with the media content and non-monetary and monetary balances associated with a user account specified in the price enquiry.

Upon determining an advice of charge using the one or more predefined rules and the non-monetary and monetary balances, in step 908, the charging system sends a price enquiry response 908 to the advice of charge function. In step 910, the advice of charge function forwards the price enquiry response to the PCEF node. In step 912, the PCEF node forwards the price enquiry response to the UE where an advice of charge extracted from the price enquiry response and displayed in the web page. For example, anyone of advice of charges 300, 400, 500, or 600 is displayed in the webpage 200.

Upon selection of the media content, the content access charging request is forwarded to the PCEF in step 914. In step 916, the PCEF sends a CCR signal with RG2 to the charging system. In step 918, the charging system sends a CCA signal with RG2 to the PCEF. In step 920, the PCEF transmits an access granted message. In step 922, the advice of charge function sends the content to the UE.

According to some embodiments, revenue management may be negotiated between the "content provider" and "service provider." For example, when a user is roaming internationally, then the subscriber's home service provider performs the charging (which includes normal+roaming charges) and then shares the revenue (or settlement) with the Foreign Service provider. Furthermore, tax consultants located in the foreign country (for example India) fills the Income Tax Return (ITR) for U.S. nationals, where a U.S. agency charges the subscriber for the ITR even though the services were delivered from a foreign country. The U.S. agency then later shares the revenue with the foreign counterparts. In this scenario, the U.S. Agency is analogous to the service provider, and the foreign agency is analogous to the content provider.

Figure 10:
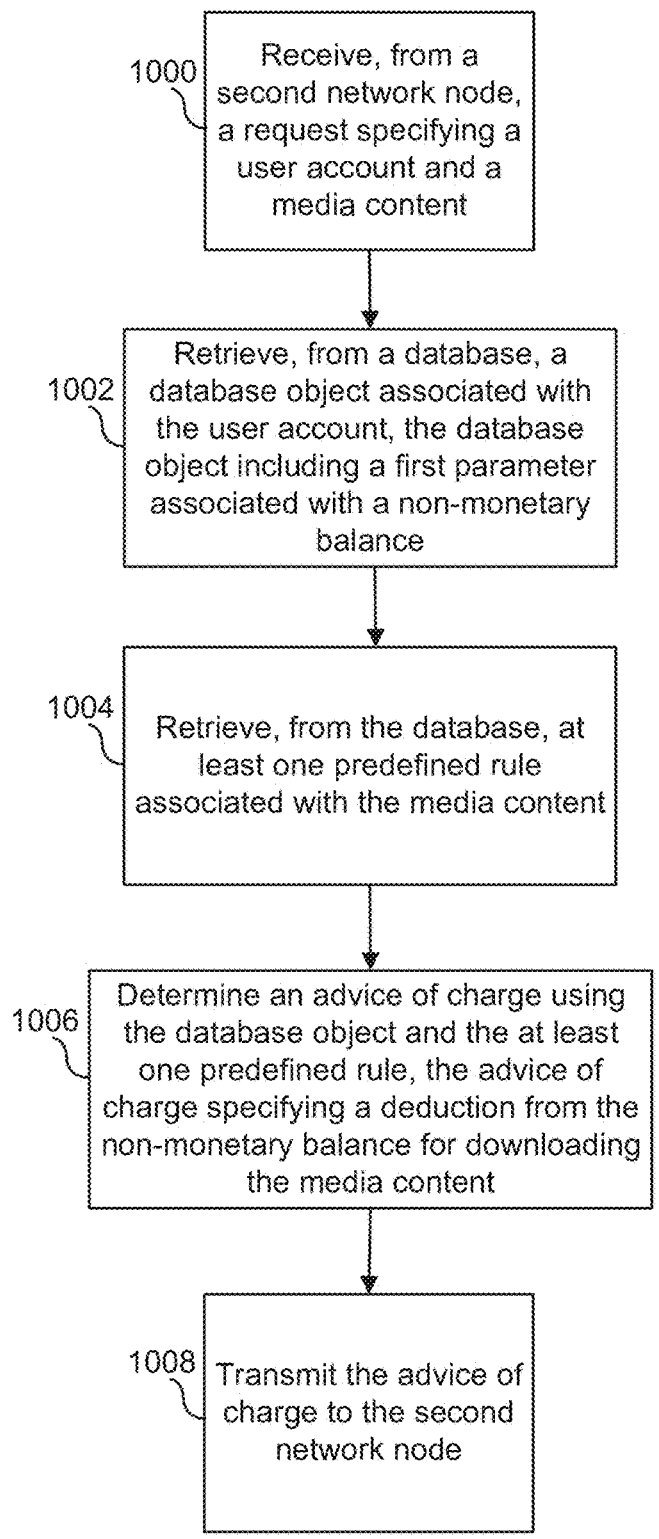
FIG. 10 illustrates an exemplary flow chart according to some embodiments.

FIG. 10 illustrates an embodiment of a process performed by a first network node such as a server of a telecom service provider (e.g., server 116). The process may start at step 1000 where the first network node receives, from a second network node, a request specifying a user account and a media content. In step 1002, the first network node retrieves, from a database, a database object associated with the user account, the database object including a first parameter associated with a non-monetary balance. In step 1004, the first network node retrieves, from the database, at least one predefined rule associated with the media content. In step 1006, the first network node determines an advice of charge using the database object and the at least one predefined rule, where the advice of charge specifies a deduction from the non-monetary balance for downloading the media content.

In step 1008, the first network node transmits the advice of charge to the second network node.

According to some embodiments, the database object includes a second parameter associated with a monetary balance, where the advice of charge is further determined using the second parameter, and the advice of charge specifies a deduction from the monetary balance for downloading the media content. Furthermore, in some embodiments, the second parameter is associated with another non-monetary balance, where the advice of charge is further determined using the second parameter, and the advice of charge specifies a deduction from the another non-monetary balance for downloading the media content. In some embodiments, the non-monetary balance specifies an amount of data available for the user account and the monetary balance specifies an amount of monetary funds available for the user account.

According to some embodiments, the at least one predefined rule specifies an amount of data required to view the content, where the advice of charge indicates that the content is available for viewing in response to the first network node determining that the first parameter specifies an amount of data available in the non-monetary balance is greater than or equal to an amount of data required to view the content.

According to some embodiments, the at least one predefined rule specifies an amount of data required to view the content and an amount of monetary funds required to view the content, where the advice of charge indicates that the content is available for viewing in response to the first network node determining that (i) the first parameter specifies an amount of data available in the non-monetary balance that is greater than or equal to the amount of data required to view the content or (ii) the second parameter specifies an amount of monetary funds in the monetary balance that is greater than or equal to the amount of monetary funds required to view the content.

In some embodiments, the first network node is associated with a charging system of a telecom service provider, and the second node is a Policy Charging Enforcement Function (PCEF) node in a 3GPP network. Furthermore, in some embodiments, the advice of charge is transmitted in a diameter credit control application.

According to some embodiments, the request includes an input parameter that specifies at least one of (i) a date, (ii) time, (iii) location of a user, (iv) whether the user is roaming or non-roaming, and (v) a media type, where the first network node further determines the advice of charge using the input parameter. For example, if the date or time specified in the request falls within a holiday period (e.g., Christmas) or promotional period (e.g., weekends), the advice of charge may include a discount or promotional deduction from one or more monetary and/or non-monetary balances. As another example, the advice of charge may take into account a geographic location of the user (e.g., user located domestically or internationally) or whether the user is on the service provider's network (e.g., non-roaming) or using another service provider's network (e.g., roaming). Furthermore, in some embodiments, the input parameter can be any one of the parameters defined for the Gy interface specification for diameter credit control charging request as specified in the RFC 4006 "Diameter Credit-Control Application" and known to one of ordinary skill in the art, and further disclosed in 3GPP TS32.299 Diameter Charging Applications, Release 12.5.0 (Jun. 27, 2014), the entire contents of which are incorporated herein by reference.

Figure 11:
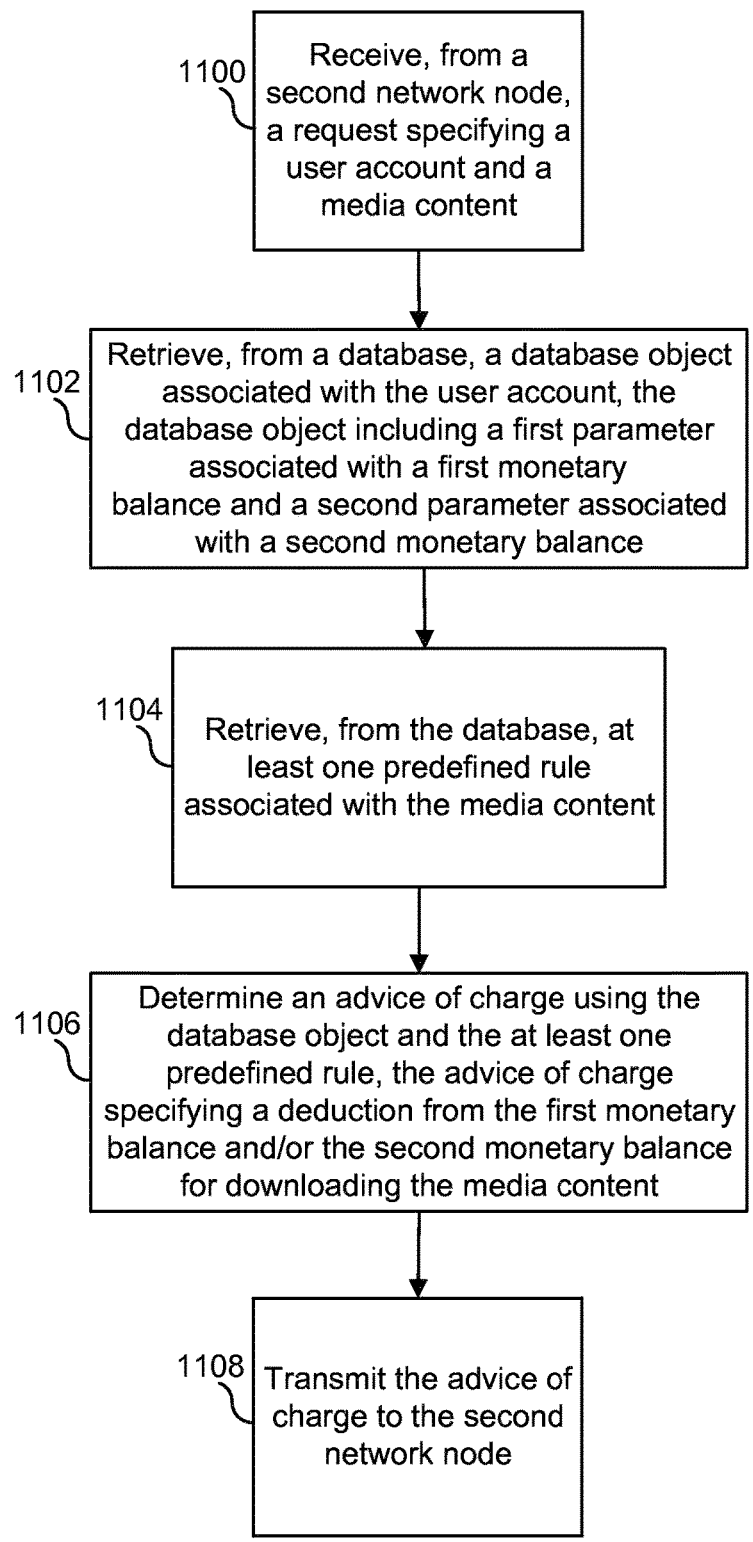
FIG. 11 illustrates an exemplary flow chart according to some embodiments.

FIG. 11 illustrates an embodiment of another process performed in the first network node. The process may start at step 1100 the first network node receives, from a second network node, a request specifying a user account and a media content. In step 1102, the first network node retrieves, from a database, a database object associated with the user account, where the database object includes a first parameter associated with a first monetary balance and a second parameter associated with a second monetary balance. In step 1104, the first network node retrieves, from the database, at least one predefined rule associated with the media content. In step 1106, the first network node determines an advice of charge using the database object and the at least one predefined rule, where the advice of charge specifies a deduction from the first monetary balance and/or second monetary balance for downloading the media content. In step 1108, the first network node transmits the advice of charge to the second network node.

Figure 12:
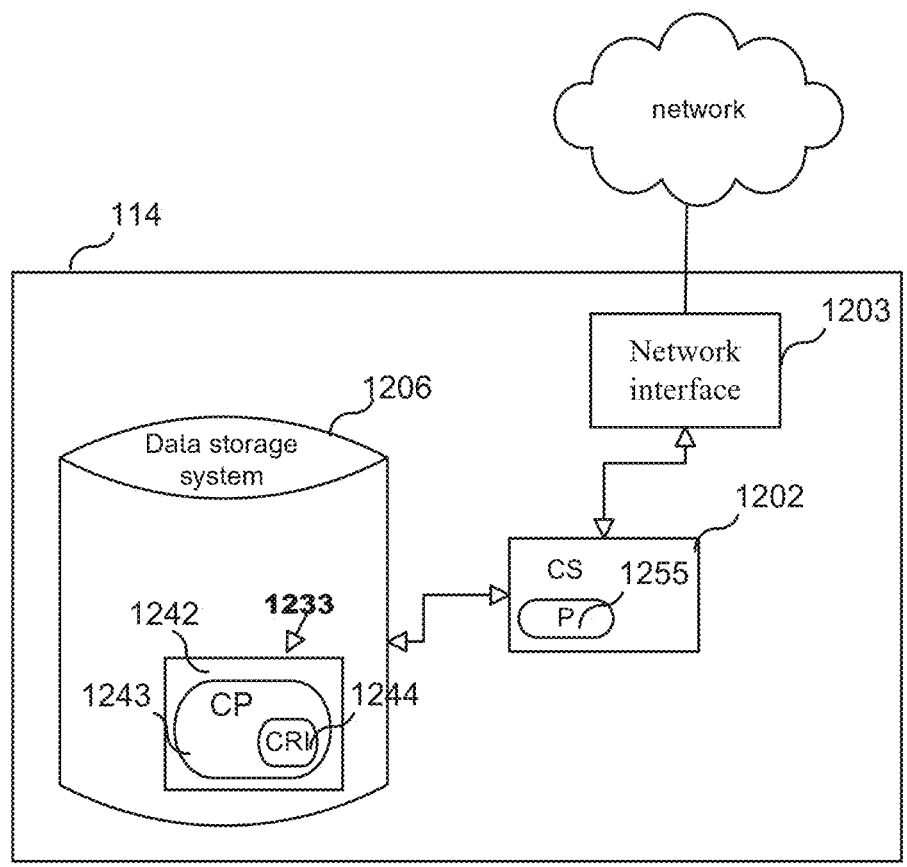
FIG. 12 illustrates an exemplary server according to some embodiments.

FIG. 12 is a block diagram of an embodiment of a network node such as the service provider server 116, content provider server 112, or PCEF 110. As shown in FIG. 12, the network node may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a network interface 1203 for use in connecting the network node to a network; and a data storage system 1206, which may include one or more non-volatile storage devices and/or one or more volatile storage devices (e.g., random access memory (RAM)). In embodiments where the network node includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI causes the network node to perform steps described above (e.g., steps described above with reference to the flow charts and message flows shown in the drawings). In other embodiments, the network node may be configured to perform steps described herein without the need for a computer program. That is, for example, computer system 1202 may consist merely of one or more ASICs. Hence, the features of the embodiments described herein may be implemented in hardware and/or software.

Figure 13:
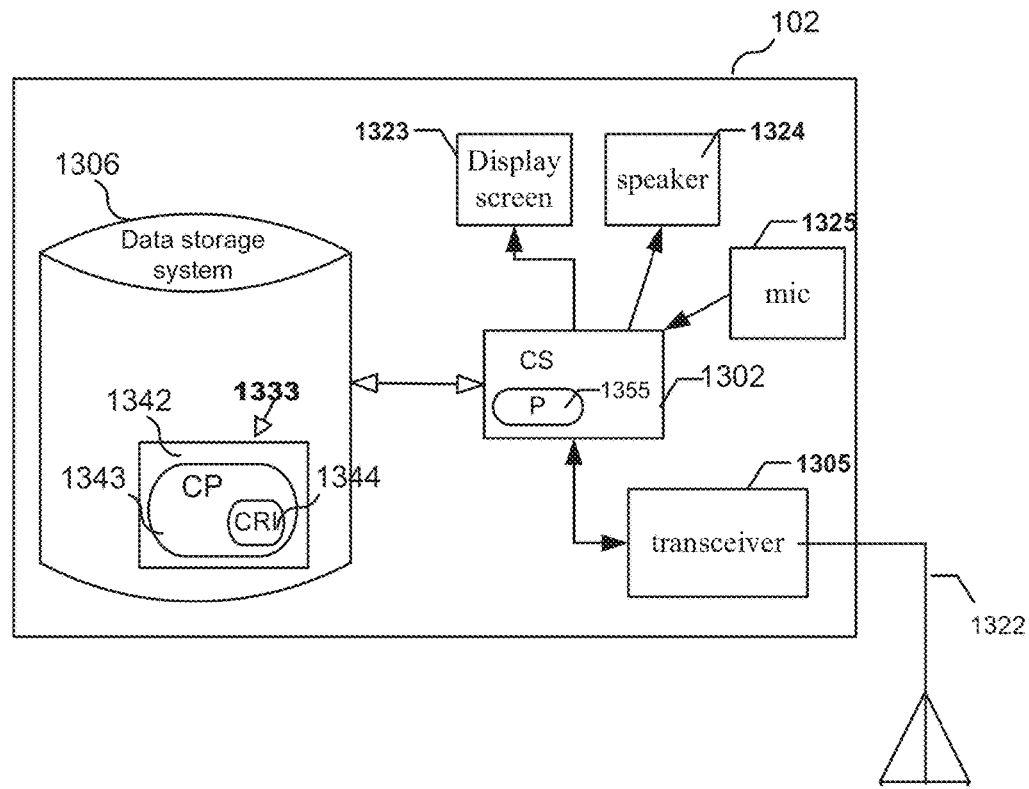
FIG. 13 illustrates an wireless communication device according to some embodiments.

FIG. 13 is a block diagram of UE 102 according to some embodiments. As shown in FIG. 13, UE 102 may include or consist of: a computer system (CS) 1302, which may include one or more processors 1355 (e.g., a general purpose microprocessor) and/or one or more circuits, such as an application specific integrated circuit (ASIC), field-programmable gate arrays (FPGAs), a logic circuit, and the like; a transceiver 1305, coupled to an antenna, 1322 for transmitting and receiving data wireless; and a data storage system 1306, which may include one or more non-volatile storage devices and/or one or more volatile storage devices (e.g., random access memory (RAM)). In embodiments where UE 102 includes a processor 1355, a computer program product (CPP) 1333 may be provided. CPP 1333 includes or is a computer readable medium (CRM) 1342 storing a computer program (CP) 1343 comprising computer readable instructions (CRI) 1344. CRM 1342 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1344 of computer program 1343 is configured such that when executed by computer system 1302, the CRI causes the UE 102 to perform steps described above (e.g., steps described above with reference to the flow charts and message flows shown in the drawings). In other embodiments, UE 102 may be configured to perform steps described herein without the need for a computer program. That is, for example, computer system 1302 may consist merely of one or more ASICs. Hence, the features of the embodiments described herein may be implemented in hardware and/or software. As shown in FIG. 13, UE 102 may include: a display screen 1333, a speaker 1324, and a microphone ("mica"), all of which are coupled to CS 1302.

While various embodiments of the present disclosure have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

AVP Attribute Value Pair
3GPP 3rd Generation Partnership Project
CP Content Provider
SP Service Provider (Like Verizon, Vodafone)
ITR Income Tax Return

The invention claimed is:

1. A method performed in a first network node, the method comprising:
   the first network node receiving, from a second network node, a request specifying a user account and a media content in response to selection of premium content by a user;
   the first network node retrieving, from a database, a database object associated with the user account, the database object including a first parameter associated with a non-monetary balance and a second parameter associated with a monetary balance;
   the first network node retrieving, from the database, at least one predefined rule associated with the media content;
   the first network node determining an advice of charge using the database object and the at least one predefined rule, the advice of charge specifying a first amount to be deducted from the non-monetary balance and a second amount to be deducted from the monetary balance for downloading the media content;
   the first network node transmitting the determined advice of charge to the second network node for displaying the determined advice of charge, wherein the determined advice of charge is transmitted after the request specifying the user account and the media content is received from the second network node without user invocation; and
   the first network node receiving, from the second network node, a response to download the media content based upon selection on the displayed advice of charge by the second network node.

2. The method according to claim 1, wherein the monetary balance specifies an amount of monetary funds available for the user account.

3. The method according to claim 2, wherein the at least one predefined rule specifies an amount of data required to view the media content and an amount of monetary funds required to view the media content,
   wherein, the advice of charge indicates that the media content is available for viewing in response to the first network node determining that (i) the first parameter specifies an amount of data available in the non-monetary balance that is greater than or equal to the amount of data required to view the media content or (ii) the second parameter specifies an amount of monetary funds in the monetary balance that is greater than or equal to the amount of monetary funds required to view the media content.

4. The method according to claim 1, wherein the non-monetary balance specifies an amount of data available for the user account.

5. The method according to claim 4, wherein the at least one predefined rule specifies an amount of data required to view the media content, wherein the advice of charge indicates that the media content is available for viewing in response to the first network node determining that the first parameter specifies an amount of data available in the non-monetary balance is greater than or equal to the amount of data required to view the media content.

6. The method according to claim 1, wherein the first network node is associated with a charging system of a telecom service provider, and the second network node is a Policy Charging Enforcement Function (PCEF) node in a 3GPP network.

7. The method according to claim 1, wherein the determined advice of charge is transmitted in a diameter credit control application.

8. The method according to claim 1, wherein the request includes an input parameter that specifies at least one of (i) a date, (ii) a time of the request, (iii) a location of a user, (iv) whether the user is roaming or non-roaming, and (v) a media type, and wherein the first network node further determines the advice of charge using the input parameter.

9. A method performed in a first network node, the method comprising:
   the first network node receiving, from a second network node, a request specifying a user account and a media content in response to selection of premium content by a user, wherein the request includes an input parameter that specifies at least one of (i) a date, (ii) a time of the request, (iii) a location of a user, (iv) whether the user is roaming or non-roaming, and (v) a media type;
   the first network node retrieving, from a database, a database object associated with the user account, the database object including a first parameter associated with a monetary balance and a second parameter associated with a non-monetary balance;
   the first network node retrieving, from the database, at least one predefined rule associated with the media content;
   the first network node determining an advice of charge using the database object and the at least one predefined rule, the advice of charge specifying a first amount to be deducted from the monetary balance and a second amount to be deducted from the non-monetary balance for downloading the media content;

the first network node transmitting the determined advice of charge to the second network node for displaying the determined advice of charge, wherein the determined advice of charge is transmitted after the request specifying the user account and the media content is received from the second network node without user invocation; and the first network node receiving, from the second network node, a response to download the media content based upon selection on the displayed advice of charge by the second network node.

10. A first network node comprising:

a processor; and a computer readable medium coupled to the processor, said computer readable medium containing instructions executable by the processor, whereby the first network node is operative to:

receive, from a second network node, a request specifying a user account and a media content in response to selection of premium content by a user, retrieve, from a database, a database object associated with the user account, the database object including a first parameter associated with a non-monetary balance and a second parameter associated with a monetary balance, retrieve, from the database, at least one predefined rule associated with the media content, determine an advice of charge using the database object and the at least one predefined rule, the advice of charge specifying a first amount to be deducted from the non-monetary balance and a second amount to be deducted from the monetary balance for downloading the media content, transmit the determined advice of charge to the second network node for displaying the determined advice of charge, wherein the determined advice of charge is transmitted after the request specifying the user account and the media content is received from the second network node without user invocation, and receive, from the second network node, a response to download the media content based upon selection on the displayed advice of charge by the second network node.

11. The first network node according to claim 10, wherein the monetary balance specifies an amount of monetary funds available for the user account.

12. The first network node according to claim 11, wherein the at least one predefined rule specifies an amount of data required to view the media content and an amount of monetary funds required to view the media content, wherein, the advice of charge indicates that the media content is available for viewing in response to the first network node determining that (i) the first parameter specifies an amount of data available in the non-monetary balance that is greater than or equal to the amount of data required to view the media content or (ii) the second parameter specifies an amount of monetary funds in the monetary balance that is greater than or equal to the amount of monetary funds required to view the media content.

13. The first network node according to claim 10, wherein the non-monetary balance specifies an amount of data available for the user account.

14. The first network node according to claim 13, wherein the at least one predefined rule specifies an amount of data required to view the media content, wherein the advice of charge indicates that the media content is available for viewing in response to the first network node determining that the first parameter specifies an amount of data available in the non-monetary balance is greater than or equal to the amount of data required to view the media content.

15. The first network node according to claim 10, wherein the first network node is associated with a charging system of a telecom service provider, and the second network node is a Policy Charging Enforcement Function (PCEF) node in a 3GPP network.

16. The first network node according to claim 10, wherein the determined advice of charge is transmitted in a diameter credit control application.

17. A first network node comprising:

a processor; and a computer readable medium coupled to the processor, said computer readable medium containing instructions executable by the processor, whereby the first network node is operative to:

receive, from a second network node, a request specifying a user account and a media content in response to selection of premium content by a user, wherein the request includes an input parameter that specifies at least one of (i) a date, (ii) a time of the request, (iii) a location of a user, (iv) whether the user is roaming or non-roaming, and (v) a media type, retrieve, from a database, a database object associated with the user account, the database object including a first parameter associated with a monetary balance and a second parameter associated with a non-monetary balance, retrieve, from the database, at least one predefined rule associated with the media content, determine an advice of charge using the database object and the at least one predefined rule, the advice of charge specifying a first amount to be deducted from the first monetary balance and a second amount to be deducted from the non-monetary balance for downloading the media content, transmit the determined advice of charge to the second network node for displaying, the determined advice of charge, wherein the determined advice of charge is transmitted after the request specifying the user account and the media content is received from the second network node without user invocation, and receive, from the second network node, a response to download the media content based upon selection on the displayed advice of charge by the second network node.

18. A computer product comprising a non-transitory computer readable, medium for storing computer instructions, which when executed by a processor causes a first network node to perform a method comprising:

receiving, from a second network node, a request specifying a user account and a media content in response to selection of premium content by a user, wherein the request includes an input parameter that specifies at least one of (i) a date, (ii) a time of the request, (iii) a location of a user, (iv) whether the user is roaming or non-roaming, and (v) a media type;

retrieving, from a database, a database object associated with the user account, the database object including a first parameter associated with a non-monetary balance and a second parameter associated with a monetary balance retrieving, from the database, at least one predefined rule associated with the media content;

determining an advice of charge using the database object and the at least one predefined rule, the advice of charge specifying a first amount to be deducted from the non-monetary balance and a second amount to be deducted from the monetary balance for downloading the media content;

transmitting the determined advice of charge to the second network node for displaying the determined advice of charge, wherein the determined advice of charge is transmitted after the request specifying the user account and the media content is received from the second network node without user invocation; and receiving, from the second network node, a response to download the media content based upon selection on the displayed advice of charge by the second network node.

19. A computer product comprising a non-transitory computer readable medium for storing computer instructions, which when executed by a processor causes a first network node to perform a method comprising:

receiving, from a second network node, a request specifying a user account and a media content in response to selection of premium content by a user;

retrieving, from a database, a database object associated with the user account, the database object including a first parameter associated with a monetary balance and a parameter associated with a non-monetary balance;

retrieving, from the database, at least one predefined rule associated with the media content;

determining an advice of charge using the database object and the at least one predefined rule, the advice of charge specifying a first amount to be deducted from the monetary balance and a second amount to be deducted from the non-monetary balance for downloading the media content;

transmitting the determined advice of charge to the second network node for displaying the determined advice of charge, wherein the determined advice of charge is transmitted after the request specifying the user account and the media content is received from the second network node without user invocation; and receiving, from the second network node, a response to download the media content based upon selection on the displayed advice of charge by the second network node.

* * * * *